C. AND A. E. BURNETT.
MANUFACTURE OF RUBBER TIRES OF THE SOLID OR BAND TYPE.
APPLICATION FILED OCT. 17, 1919.
1,351,156.
Patented Aug. 31, 1920.
2 SHEETS—SHEET 1.
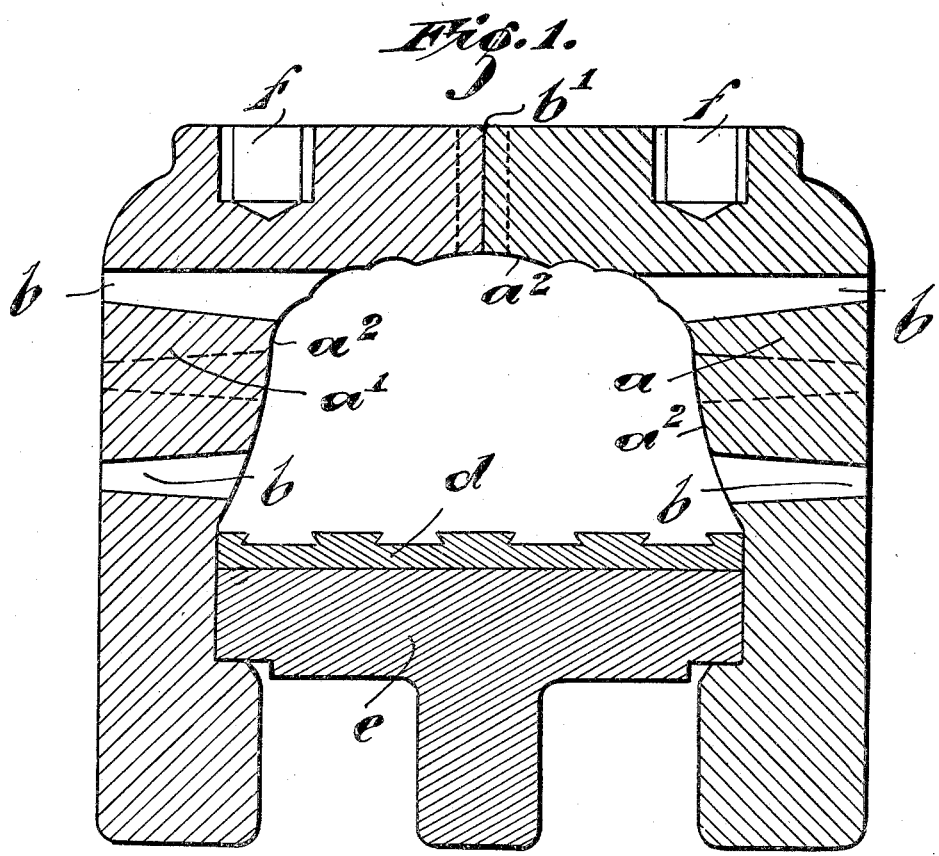
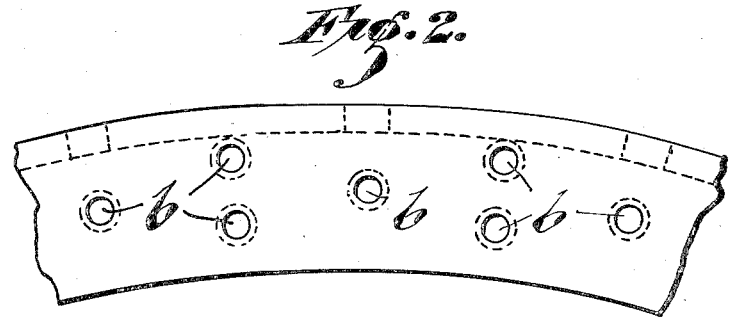
Inventors—
Cuthbert Burnett and
Albert Edward Burnett,
By B. Singer, Atty.

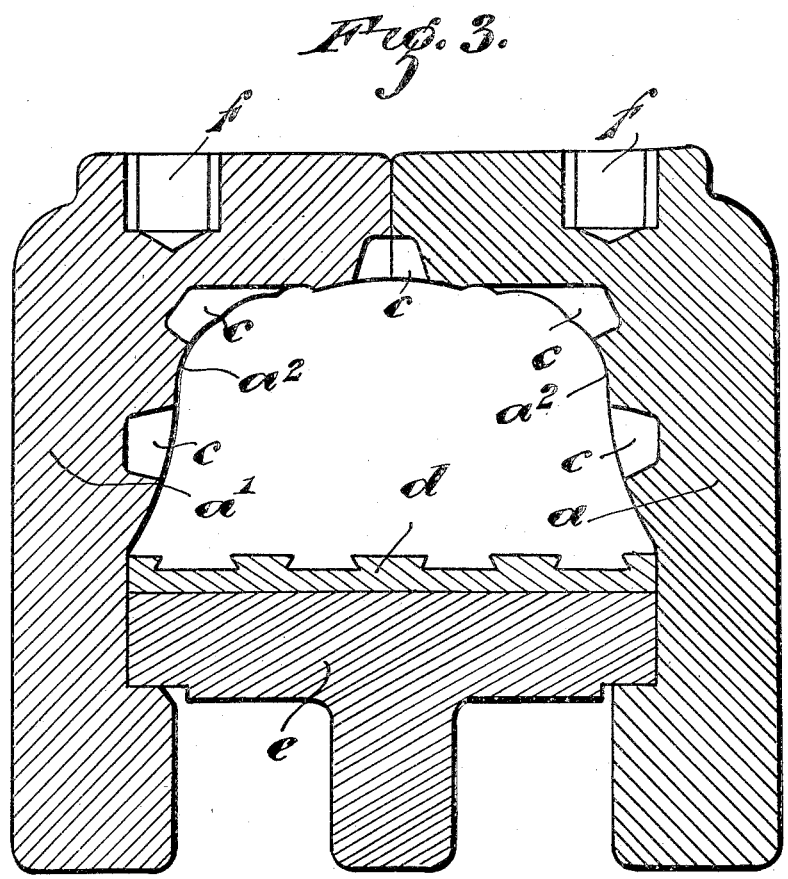

UNITED STATES PATENT OFFICE.

CUTHBERT BURNETT AND ALBERT EDWARD BURNETT, OF TROWBRIDGE, ENGLAND.

MANUFACTURE OF RUBBER TIRES OF THE SOLID OR BAND TYPE.

1,351,156.  Specification of Letters Patent.  Patented Aug. 31, 1920.

Application filed October 17, 1919. Serial No. 331,457.

*To all whom it may concern:*

Be it known that we, CUTHBERT BURNETT, manufacturer, and ALBERT EDWARD BURNETT, works manager, both subjects of the Kingdom of Great Britain, and residing at "Sunnybank," Trowbridge, in the county of Wilts, England, have invented certain new and useful Improvements in and Relating to the Manufacture of Rubber Tires of the Solid or Band Type, of which the following is a specification.

These improvements relate to the manufacture of rubber tires of the solid or band type each as used for motor lorries, buses, and other heavy vehicles, and comprise an improved method of and means for reducing such tires to the required approximate size and shape preparatory to placing same in the finishing molds.

In order that this invention may be clearly understood and readily carried into practice, reference may be had to the appended two sheets of explanatory drawings, upon which:—

Figure 1 is a transverse section through a mold embodying one method of carrying out the invention.

Fig. 2 is a side elevation to a reduced scale of a portion of the mold shown in Fig. 1.

Fig. 3 is a similar transverse section to that of Fig. 1 but illustrating a modification.

Hitherto the practice has been to reduce the built up tires to the requisite approximate size either by means of a cutting tool in combination with a slide rest, or by the more common method of using a knife by hand; by either of these methods a considerable amount of time and consequent cost for labor is involved. Now according to this invention a mold in two duplicate halves $a$, $a^1$ is employed, the interior $a^2$ of which halves are shaped approximately to the configuration of the finished tire, as also to embrace the band $d$ and rim $e$ of the wheel.

These molds are provided with any desired number of perforations $b$ which are arranged in suitable position to allow of the escape of the bulk of the spew, the said perforations $b$ being preferably of the shape of coned round holes with the larger diameter of the holes next to the tire and through which holes the surplus rubber is forced under pressure, after which the rubber extending beyond the outer face of the mold is cut off, the molds then easily separated, and the protruding spews formed by the holes detached, thus rendering the tire ready to be placed in the finishing mold.

Instead of holes, annular grooves $c$ may be formed in the inside of the mold, the projecting ridges of spew thus formed on the built up tire being then easily removed.

It will be understood that provision is made for some portion of the excess rubber to be spewed out at holes $b^1$ at the joint around the circumference of the molds in the ordinary manner.

Prior to being inserted in the aforedescribed reducing molds the outer corners of the circumference of the built up solid tire are removed, so as to reduce the amount of spew to be dealt with at these points. Holes $f$ are provided for receiving the lifting handles.

What we claim as our invention and desire to secure by Letters Patent is:—

A tire mold comprising a pair of separable members having a mold chamber formed in their opposing sides, and also provided with spew receiving openings in their side walls out of the midplane of the mold and spew receiving openings in their outer walls at the opposing portions thereof.

In witness whereof we have hereunto set our hands.

CUTHBERT BURNETT.
ALBERT EDWARD BURNETT.